United States Patent
Bhasin

(10) Patent No.: US 10,305,762 B2
(45) Date of Patent: May 28, 2019

(54) TECHNIQUES FOR DETERMINING QUEUE BACKLOGS, ACTIVE COUNTS, AND EXTERNAL SYSTEM INTERACTIONS IN ASYNCHRONOUS SYSTEMS

(71) Applicant: Oracle International Corporation, Redwood Shores, CA (US)

(72) Inventor: Malkit Singh Bhasin, Chino Hills, CA (US)

(73) Assignee: Oracle International Corporation, Redwood Shores, CA (US)

(*) Notice: Subject to any disclaimer, the term of this patent is extended or adjusted under 35 U.S.C. 154(b) by 583 days.

(21) Appl. No.: 14/975,067

(22) Filed: Dec. 18, 2015

(65) Prior Publication Data
US 2016/0182326 A1    Jun. 23, 2016

Related U.S. Application Data

(60) Provisional application No. 62/094,910, filed on Dec. 19, 2014.

(51) Int. Cl.
*H04L 12/26*    (2006.01)
*H04L 12/861*   (2013.01)
(Continued)

(52) U.S. Cl.
CPC ........ *H04L 43/065* (2013.01); *H04L 43/0817* (2013.01); *G06F 9/505* (2013.01);
(Continued)

(58) Field of Classification Search
CPC ........... G06F 11/3466; G06F 2201/875; G06F 2209/501; G06F 2209/548; G06F 9/505;
(Continued)

(56) References Cited

U.S. PATENT DOCUMENTS 9,201,716 B1* 12/2015 Leonard .................. G06F 9/546
2001/0012291 A1* 8/2001 Verbil ................... H04M 3/523
370/385

(Continued)

FOREIGN PATENT DOCUMENTS

TW         201140471        11/2011

OTHER PUBLICATIONS

U.S. Appl. No. 14/975,100, Non-Final Office Action dated Nov. 3, 2017, 47 pages.
(Continued)

*Primary Examiner* — Barbara B Anyan
(74) *Attorney, Agent, or Firm* — Kilpatrick Townsend & Stockton, LLP

(57) ABSTRACT

Techniques are disclosed for determining inbound and outbound external queue backlogs, internal queue backlogs, active counts, and external system interaction data values in systems employing asynchronous communication techniques, which may be used for comparative performance analysis and bottleneck detection in service-oriented applications. Key statistics related to key points in a SOA system, for key activities during processing of transactions in the SOA system, are collected and aggregated. The statistics for the time interval may be added to corresponding cumulative statistics, and persisted to storage. Reports may be generated based upon the statistics to present to a user. Automated processes may be implemented to use the statistics to identify the existence and likely cause of SOA application performance issues, and potentially to attempt to remediate the issues.

20 Claims, 10 Drawing Sheets

(51) Int. Cl.
*H04L 12/801* (2013.01)
*G06F 9/50* (2006.01)
*H04L 12/24* (2006.01)

(52) U.S. Cl.
CPC ............ *H04L 41/044* (2013.01); *H04L 47/10* (2013.01); *H04L 47/15* (2013.01); *H04L 49/90* (2013.01)

(58) Field of Classification Search
CPC ............... H04L 47/6215; H04L 47/826; H04L 41/0896
See application file for complete search history.

(56) References Cited

U.S. PATENT DOCUMENTS

| | | | |
|---|---|---|---|
| 2002/0069281 A1* | 6/2002 | Dillenberger | G06F 9/505 709/226 |
| 2005/0047783 A1* | 3/2005 | Sisto | H04L 47/15 398/71 |
| 2009/0157872 A1 | 6/2009 | Pinkston et al. | |
| 2009/0177692 A1 | 7/2009 | Chagoly et al. | |
| 2009/0216874 A1 | 8/2009 | Thain et al. | |
| 2010/0183304 A1* | 7/2010 | Spector | H04J 3/1694 398/66 |
| 2011/0051604 A1* | 3/2011 | Nishimura | H04L 47/10 370/235 |
| 2011/0078300 A9 | 3/2011 | Grelewicz et al. | |

OTHER PUBLICATIONS

Magalhaes et al., Adaptive Profiling for Root-Cause Analysis of Performance Anomalies in Web-Based Applications, 10th IEEE International Symposium on Network Computing and Applications (NCA), Available online at: https://doi.org/10.1109/NCA.2011.30., Aug. 2011, pp. 25-27.

U.S. Appl. No. 14/975,100 received a Final Office Action, dated May 15, 2018, 58 pages.

U.S. Appl. No. 14/975,100, Notice of Allowance dated Oct. 29, 2018, 12 pages.

* cited by examiner

TECHNIQUES FOR DETERMINING QUEUE BACKLOGS, ACTIVE COUNTS, AND EXTERNAL SYSTEM INTERACTIONS IN ASYNCHRONOUS SYSTEMS

RELATED APPLICATIONS

The present application is a non-provisional of and claims priority to U.S. Provisional Patent Application No. 62/094,910, filed Dec. 19, 2014, entitled "TECHNIQUES FOR DETERMINING QUEUE BACKLOGS, ACTIVE COUNTS, AND EXTERNAL SYSTEM INTERACTIONS IN ASYNCHRONOUS SYSTEMS," the entire contents of which is incorporated herein by reference for all purposes.

FIELD

Embodiments of the invention relate to the field of computing systems. More specifically, various embodiments described herein relate to determining internal and external queue backlogs, active counts, and/or external system interactions in asynchronous systems.

BACKGROUND

The term service-oriented architecture (SOA) generally refers to a software strategy that discrete functions from enterprise applications into interoperable, standards-based services, which can then be combined with other services and reused to meet particular business needs. Thus, using SOA, functionality provided by applications, potentially from multiple vendors, may be "exposed" as one or more services, and then "orchestrated" using orchestration capabilities like Business Process Execution Language (BPEL) into new composite applications. These composite applications may be developed to support an organization's business processes.

Service Component Architecture (SCA) is a software technology created by major software vendors, including IBM, Oracle, and TIBCO. SCA describes a model for building applications and systems using SOA principles, and further builds on open standards, such as Web services, to extend and complement existing SOA approaches.

A basic aspect of SCA is a composite, which is a unit of deployment and includes services that can be accessed remotely. A composite is made up of one or more components, of each which may be directed to performing a particular task. Components may offer their functions as services, which may be used either by other components within the same module or which can be made available for use outside the module through entry points. Components may also depend on services provided by other components—either local or remote—and are commonly called references. References may be linked to services provided by other components in the same composite, or may be linked to services provided outside the composite, which potentially may be provided by other composites. Also included within a composite are linkages between references and services, which may be referred to as wires.

As software complexity continues to rise, SOA applications may similarly increase in complexity. For example, an application may include many composites interacting with each other and with other external systems, and each composite may include multiple components. With this increased complexity, it managing these SOA applications may be difficult. For example, when the performance of an SOA system is negatively impacted, it may be difficult to identify which, if any, of the portions of a large SOA application are responsible for the performance degradation, and also to determine the causes of the performance degradation with respect to those specific portions.

Accordingly, there is a need for easier maintenance, fault detection, and troubleshooting of complex SOA applications.

BRIEF SUMMARY

The present disclosure relates generally to determining internal and external queue backlogs, active counts, and/or external system interaction data in asynchronous systems. In some embodiments, the internal and external queue backlogs, active counts, and external system interaction data may be used for comparative performance analysis and bottleneck detection in service-oriented applications.

Service-oriented architecture (SOA) systems allow the reuse of functionality across business processes and are generally used for integration between different business systems using a standards-based approach. SOA systems may allow for higher-level services to be built using more granular lower-level discrete functions. For performance and scalability reasons, decoupled architectures may be employed by SOA applications. In such cases, service engines may use internal queues to store asynchronous requests, and applications may interact with external systems using message oriented middleware (MOM) such as queues (referred to herein as "external queues"). However, the overall performance of SOA applications may depend on a number of factors, such as external system performance, resource adequacy, resource match, proper configurations, network use and availability, database use and availability, among others. Key manifestations of sub-optimal or underperforming SOA systems may include the development of backups in internal and external queues. Therefore, in order to properly diagnose SOA and SOA-like applications, techniques described herein may include determining and analyzing the amount of backups in various system queues.

However, diagnosing performance issues for systems such as SOA may be challenging in many cases. For example, certain SOA applications may involve multiple services interacting with each other and external EIS/Legacy systems for end-to-end processing. Such interactions may be synchronous or asynchronous in nature. Since different sub-systems may be processing requests at different rates, due to configurations and/or resource constraints and/or load, etc., backups may build in the system. Such backups may be in internal queues maintained within the SOA applications, or in external queues used to interact with external systems.

It may be important to identify such backups in order to properly diagnose performance issues in SOA applications. Also, since different service engines and bindings/adapters may maintain thread pools (which may be configured) that are used for processing requests, it may be important to know the active counts at a particular point in time. Additionally, performance issues in a system may be due to one or more external systems placing or removing too many or too few messages from an external queue over a period of time. However, external queues often do not provide access to detailed information about their state. Thus, information describing the interactions of external queues with external systems might not be available. Furthermore, attempting to monitor a SOA application to determine queue depths and active counts over time, especially for large-scale SOA infrastructures implementing many SOA applications, composites, components, BPELs, queues, etc., may be extremely resource intensive, and thus typically may not be performed in production environments.

As described below in detail, the present disclosure relates to determining internal and external queue backlogs, active counts, and external system interaction data in asynchronous systems. In various embodiments, the backlogs, active counts, and external system interaction data may be used for comparative performance analysis and bottleneck detection in service-oriented architecture type applications and other similar systems. In some embodiments, a central performance tracking module (or "CPTM") may be implemented and used to determine external queue backlogs without interacting with any external entities (e.g., external systems or client devices) writing to the external queues or reading from the external queues. In some embodiments, a central performance tracking module may rely only upon data gathered from within the SOA application itself, potentially along with some periodic queue depth data returned from external queues.

Additionally, in certain embodiments, portions of the SOA system involved in executing SOA application components may be modified to provide the CPTM with details related to activity of the SOA system. In some embodiments, such reporting modules may be configured to send report messages to the CPTM at a variety of points of execution, such as when a new internal queue is registered/started, when a new external queue is to be utilized/started, when a message is enqueued, when a message is dequeued, when a message is closed, when a message is faulted, etc. In some embodiments, such reporting modules may utilize specific functions/routines/API calls to report each such execution occurrence, which causes the CPTM to be notified of the occurrence.

Additionally, in some cases, for a time period having a beginning time and an ending time, reporting modules may determine, by querying an inbound or outbound external queue, a beginning queue depth corresponding to the beginning time and/or an ending queue depth corresponding to the ending time. The reporting modules also may determine the same queue depth values for an outbound external queue and/or an internal queue as well. These values may be and reported to the CPTM using report messages. In some embodiments, the reporting modules may send data to the CPTM to report a number of messages removed from the inbound queue by the application during a time period, and/or a number of messages added to the outbound queue by the application during the time period. Additionally or alternatively, the reporting modules may send data to the CPTM to report a number of messages "closed" by the application during the time period (i.e., indicating successful processing of the message) and/or a number of messages "faulted" by the application during the time period (i.e., indicating unsuccessful processing of the messages).

To report this data, the reporting modules may send a message to the CPTM each time a message is pulled from an inbound external queue, each time a message faults, each time processing completes for a message, and/or each time a message is pushed to an outbound external queue. In some cases, the CPTM also may determine the overall values for each measure for the time period based upon all of these messages, which may be referred to as performing an aggregation. The CPTM, using this reported data, may determine the amount of messages placed into the inbound external queue by a third-party system during a time period, and/or may determine the amount of messages taken from the outbound external queue by a third-party system during the time period, without needing to have any interaction with any third party system. In some cases, the CPTM also may determine backups for external and internal queues during a time period. This data may be collected and/or determined for a time period and persisted as a performance record (or "snapshot") specific to that time period. Thus, the CPTM may generate these snapshots on a rolling basis for multiple time periods. Based upon snapshots for multiple periods, a report generation module and/or performance monitor module may create custom data values specific to custom time periods that may encompass multiple time periods. Based upon the determined backlog amounts, active counts, external systems interaction data, etc., the CPTM (and/or the performance monitor module) may be configured to determine whether performance issues are affecting the application, and whether the cause of the performance issues is due to the third-party systems writing to and/or reading from the external queues, etc.

Accordingly, key statistics related to key points in a SOA system for key activities during processing of transactions in the SOA system may be periodically reported by reporting modules, and collected and aggregated by the CPTM. Such statistics may be stored in one or more persistence stores to allow for powerful analysis to be carried out for any combination of current and/or previous time interval(s). As a result, in some cases, it need not be necessary to reproduce a potential performance issue, which may no longer exist in the system or be reproducible, to enable analysis of a SOA system for any particular point in time.

The foregoing, together with other features and embodiments will become more apparent upon referring to the following specification, claims, and accompanying drawings.

DETAILED DESCRIPTION

Figure 1:
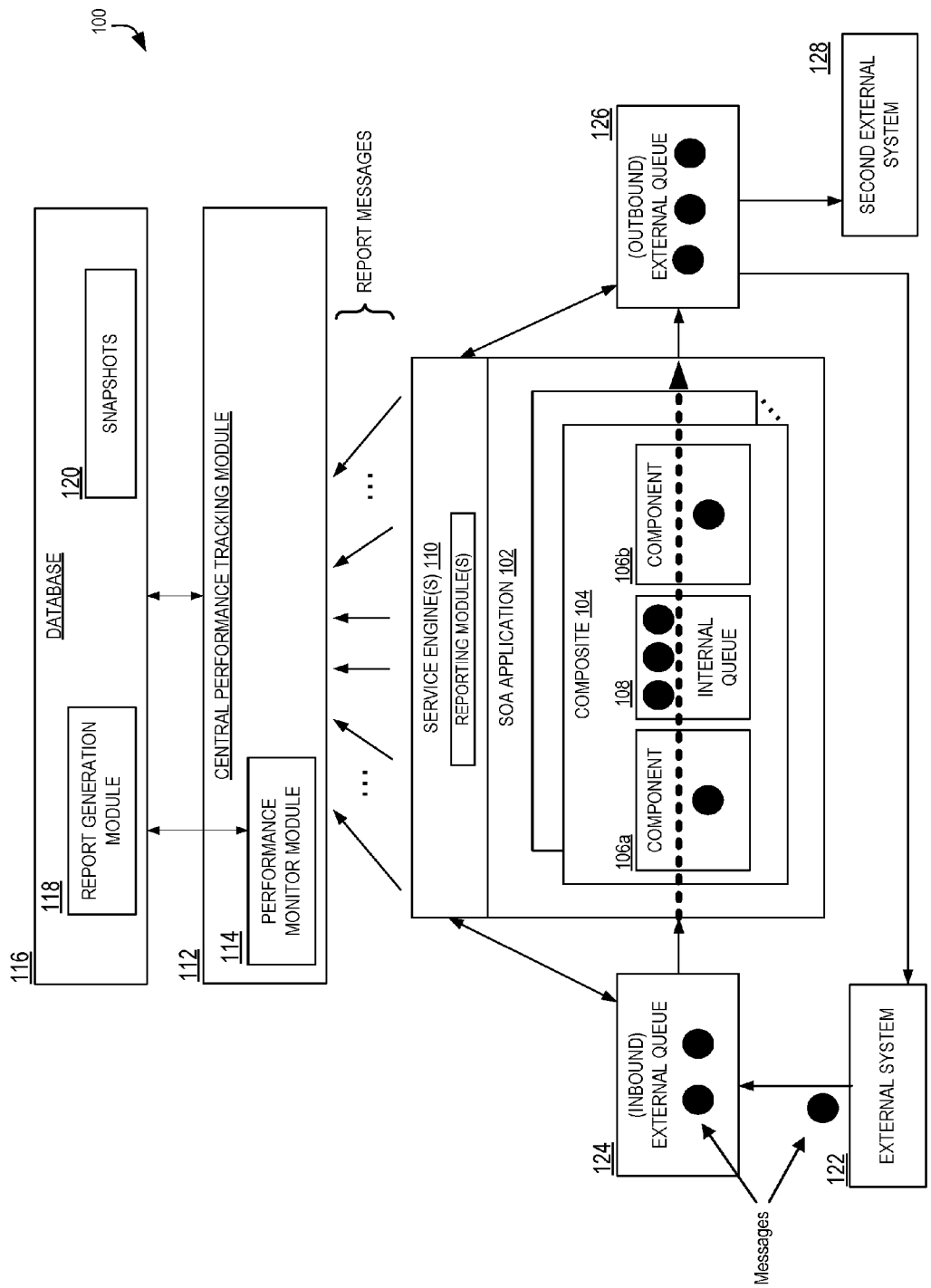
FIG. 1 illustrates a simplified high-level block diagram and functional overview of a SOA system, including a central performance tracking module for determining internal and external queue backlogs, active counts, and/or external system interaction data, according to one or more embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Generally speaking, SOA systems allow the reuse of functionality across business processes and are generally used for integration between different business systems using a standards-based approach. SOA systems may allow for higher-level services to be built using more granular lower-level discrete functions.

For performance and scalability reasons, a decoupled (or "modular") architecture generally may be employed by SOA applications. In such cases, service engines may use internal queues to store asynchronous requests, and applications may interact with external systems using message oriented middleware (MOM) such as queues (referred to herein as "external queues").

However, as described above, the overall performance of SOA applications depends on number of factors, such as external system performance, resource adequacy, resource match, proper configurations, network use and availability, database use and availability, among others. A key manifestation of sub-optimal or underperforming SOA systems is the development of backups in internal and external queues. Therefore, in order to properly diagnose SOA and SOA-like applications, determining and analyzing the amount of backups in various system queues may be an important step.

Accordingly, diagnosing performance issues for systems such as SOA is a challenge. Typical SOA Applications involve multiple services interacting with each other and external EIS/Legacy systems for end-to-end processing. Such interactions may be synchronous or asynchronous in nature. Since different sub-systems may be processing requests at different rates, due to configurations and/or resource constraints and/or load, etc., backups may build in the system. Such backups may be in internal queues maintained within the SOA Applications, or in external queues used to interact with external systems.

It may be important to identify such backups in order to properly diagnose performance issues in SOA Applications. Also, since different service engines and bindings/adapters may maintain thread pools (which may be configured) that are used for processing requests, it may be important to know the active counts at a particular point in time. Additionally, performance issues in a system may be due to one or more external systems placing or removing too many or too few messages from an external queue over a period of time. However, external queues often do not provide access to detailed information about their state. Thus, information describing the interactions of external queues with external systems might not be available. Furthermore, attempting to monitor a SOA application to determine queue depths and active counts over time, especially for large-scale SOA infrastructures implementing many SOA applications, composites, components, BPELs, queues, etc., may be extremely resource intensive, and thus typically may not be performed in production environments.

As used herein, an "active count" generally refers to the number of requests from a queue that are under active processing. "Snapshot statistics" generally refer to statistics captured at the end of a defined time interval with a clearly defined start time and end time, which may correspond to the summary of executions that happened during that interval and the state of the system in that interval. Thus, a "snapshot" may encompass statistical data associated with a period of time having a defined start time and defined end time. For example, a snapshot may be a 10 minute period, and may begin, for example, at 12:20 pm and end at 12:30 pm. In contrast, the term "cumulative" may be used to refer to total statistical values, which may encompass multiple snapshot time periods. For example, a "cumulative" statistic may represent all data since a particular point in time (e.g., a time of a server first starting or time of origination), and thus, may comprise data associated with many different snapshot time periods.

The present disclosure relates generally to determining internal and external queue backlogs, active counts, and external system interaction data in asynchronous systems. In various embodiments, the backlogs, active counts, and external system interaction data may be used for comparative performance analysis and bottleneck detection in service-oriented architecture type applications and other similar systems.

In some embodiments, a central performance tracking module (or "CPTM") may be implemented and used to determine external queue backlogs without interacting with any external entities (e.g., external systems or client devices) writing to the external queues or reading from the external queues. In some embodiments, a central performance tracking module may rely only upon data gathered from within the SOA application itself, potentially along with some periodic queue depth data returned from external queues.

Additionally, in certain embodiments, portions of the SOA system involved in executing SOA application components (e.g., service engines, adapters/bindings, etc.) may be modified (or instrumented) to provide the CPTM with details related to activity of the SOA system. In some embodiments, these modules (which may be referred to as reporting modules) may be configured to send report messages to the CPTM at a variety of points of execution, such as when a new internal queue is registered/started, when a new external queue is to be utilized/started, when a message is enqueued, when a message is dequeued, when a message is closed, when a message is faulted, etc. In some embodiments, such reporting modules may utilize specific functions/routines/API calls to report each such execution occurrence, which causes the CPTM to be notified of the occurrence.

Additionally, in some embodiments, for a time period having a beginning time and an ending time, reporting modules (e.g., service engines, bindings/adapters, etc.) determine, by querying an inbound or outbound external queue, a beginning queue depth corresponding to the beginning time and/or an ending queue depth corresponding to the ending time. The reporting module may also determine the same queue depth values for an outbound external queue and/or an internal queue as well. These values may be and reported to the CPTM using report messages.

In some embodiments, the reporting modules may send data to the CPTM to report a number of messages removed from the inbound queue by the application during a time period, and/or a number of messages added to the outbound queue by the application during the time period. Additionally or alternatively, the reporting modules may send data to the CPTM to report a number of messages "closed" by the application during the time period (i.e., indicating successful processing of the message) and/or a number of messages "faulted" by the application during the time period (i.e., indicating unsuccessful processing of the messages).

To report this data, in some embodiments the reporting modules may send a message to the CPTM each time a message is pulled from an inbound external queue, each time a message faults, each time processing completes for a message, and/or each time a message is pushed to an outbound external queue. In some cases, the CPTM also may determine the overall values for each measure for the time period based upon all of these messages, which may be referred to as performing an aggregation.

In certain embodiments, the CPTM, using this reported data, may determine the amount of messages placed into the inbound external queue by a third party system during a time period, and/or may determine the amount of messages taken from the outbound external queue by a third party system during the time period, without needing to have any interaction with any third party system. In some cases, the CPTM also may determine backups for external and internal queues during a time period. This data may be collected and/or determined for a time period and persisted as a performance record (or "snapshot") specific to that time period. Thus, the CPTM may generate these snapshots on a rolling basis for multiple time periods. Based upon snapshots for multiple periods, a report generation module and/or performance monitor module may create custom data values specific to custom time periods that may encompass multiple time periods.

Based upon the determined backlog amounts, active counts, external systems interaction data, etc., the CPTM (and/or the performance monitor module) may be configured to determine whether performance issues are affecting the application, and whether the cause of the performance issues is due to the third party systems writing to and/or reading from the external queues, etc.

Accordingly, in some embodiments, key statistics related to key points in a SOA system for key activities during processing of transactions in the SOA system may be periodically reported by reporting modules, and collected and aggregated by the CPTM. Such statistics may be stored in one or more persistence stores to allow for powerful analysis to be carried out for any combination of current and/or previous time interval(s). As a result, in some cases, it need not be necessary to reproduce a potential performance issue, which may no longer exist in the system or be reproducible, to enable analysis of a SOA system for any particular point in time.

As described above, in some embodiments operational statistics relating to a SOA system are received at a central performance tracking module (CPTM). The operational statistics may include data for parts of or an entire SOA system during one or more time interval. Statistics generated for the time interval, in some embodiments, may be added to corresponding cumulative statistics. As a time interval expires, a set of snapshot statistics (e.g., a set of statistics associated with a particular time period) may be generated, which may include time period-specific and/or cumulative statistics. The set of snapshot statistics also may be persisted, for example, saved in a data store. A new time period then may begin and the process may repeat with additional statistics for that time period being generated anew.

Accordingly, several benefits and advantages may be provided in various techniques and/or combinations of techniques described herein. For example, certain embodiments may allow for users (which may be manual users such as system administrators, or programmatic users such as automated software processes) to quickly and easily identify bottlenecks and/or backups in the system. Further, some embodiments may be especially useful for tuning a SOA system for scaling or performance improvement, based on results which are easily and quickly available, and the impact of a change in one portion of the SOA system (e.g., a change to a first composite) to another portion of the SOA system (e.g., a different composite) may be easily seen. Certain embodiments also allow for a centralized point of data collection, as opposed to systems having different monitoring and management tools that may be specific to separate composites/components/etc. Additionally, various embodiments described herein also may involve only very small resource overhead (e.g., memory resources, processor resources, network resources, etc.) to be used for the statistical data gathering, as only small fragments of simple data may be reported back to the central location. Moreover, in embodiments persisting the statistical snapshot data for many periods, rich historical analysis/benchmarking/baseline computation may be generated in a straightforward manner, and flexible snapshot comparisons may be performed similarly.

Referring now to FIG. 1, a simplified high-level block diagram and functional overview are shown, illustrating an SOA system 100 including a central performance tracking module (CPTM) 112 for performing determinations and analyses on internal and external queue backlogs, active counts, and/or external system interaction data, according to various embodiments described herein. It should be understood that the embodiment depicted in FIG. 1 is merely one example and is not intended to unduly limit the claimed embodiments of the present invention. One of ordinary skill in the art would recognize many possible variations, alternatives, and modifications to this illustrated system 100. For example, there may be more or fewer applications 102, composites 104, components 106, messages, external systems 122, service engines 110, queues (e.g., 108, 124, 126), etc.

In FIG. 1, an SOA application 102 is depicted as including a composite 104 including two components 106a and 106b interacting via an internal queue 108. Although only a single application, composite, and internal queue are depicted here, in other examples, many SOA applications 102 may be deployed, including many more (or fewer) composites, components, subcomponents/BPELs, internal queues, etc. Each of the composites and/or components, of course, may be standalone modules, including possibly from different developers and/or originators, and may execute on one computing device or across many computing devices, which may be in a same geographic location or separated in one or more different geographic locations (e.g., data centers, buildings, cities, states, countries, etc.). In some embodiments, SOA application 102 may be implemented using a service engine 110, which may manage the execution of the various components for the SOA application 102, may manage thread pools for the execution, etc. Accordingly, the term SOA application 102 as used herein may be meant to include the portions of the service engine 110 that implement the SOA application 102 itself. In some embodiments, the service engine 110 may be adapted to interact with internal and/or external queues, and to determine operational information (e.g., current queue depths) for these queues.

The SOA application 102, during execution, may be configured to retrieve messages (also sometimes referred to as "requests") from an "inbound" external queue, process these messages to yield an output message (e.g., perhaps utilizing internal queues utilized one or more components of the SOA application 102), and may write the output messages to an "outbound" external queue. In some cases, these external queues may be located at a same computing device as portions (or all) of the SOA application 102. Additionally or alternatively, external queues may be provided by completely different computing devices, which may (or may not) be accessed via a communication network or networks (not illustrated herein for the sake of clarity).

An external system or client 122, for example, an external computing device, may interact with the SOA application 102 by causing messages (e.g., requests) to be placed in an inbound external queue 124 (inbound from the perspective of the SOA application). In FIG. 1, one such message, represented as a black circle, is located between the external system 122 and the external queue 124, indicating that the message is being transmitted to the external queue 124. The external queue 124 in this example stores (or houses) two messages, although it should be understood that in some implementations and/or configurations such queues 124 may be considerably larger and may include hundreds, thousands, or more messages at any one time. Moreover, the messages stored within the queue 124 may be for a large number (e.g., hundreds, thousands, etc.) of different SOA applications provided by the SOA system.

As discussed above, the SOA application 102 may retrieve messages from the inbound external queue 124 and process these messages. In FIG. 1, the SOA application 102 is shown as currently processing five messages, one of which is being processed by a first component 106a, one of which is being processed by a second component 106b, and three of which are within an internal queue 108 configured to pass data and other communications between the components 106. Thus, this SOA application 102 may be referred to as having five messages currently/actively being processed (or having five "active" messages). FIG. 1 also includes an outbound external queue 126 currently holding three processed messages, which may be retrieved by the same external system 122 and/or by a different (optional) second external system 128.

In some embodiments, the SOA application 102 (and/or the service engine 110 and reporting module(s)), may be configured to send a report message to the CPTM 112 at various points during the processing of a message to report the occurrence of the message passing through that particular point. Such messages may be sent using various well-known techniques including, for example, IPC techniques, function calls, network messages, etc. The CPTM 112 may, based upon a number of such report messages, determine a variety of statistical measures associated with the various locations, composites, components, queues, etc. Accordingly, the CPTM 112 may use report messages, along with other data relating the execution of the SOA system 100, to generate a wide variety of statistical measures for the SOA application 102, and may store various "snapshots" 120 in a database 116, where each snapshot may include a set of determined statistical measures and/or aggregated statistical measures for a time period. The database 116 and snapshots 120 which may be located within the same computing devices or different computing devices as the CPTM 112 and/or the SOA application 102.

Using the data (e.g., report messages) received from the SOA application 102, the CPTM 114 may determine various internal and/or external queue backlogs, active counts, and/or interaction data of external systems in asynchronous systems such as the system 100 disclosed herein.

In some embodiments, SOA system 100 also may include a performance monitor module 114 and a report generation module 118. In some cases, modules 114 and/or 118 may be software modules executable by one or more processors of a computing device, and these modules may be implemented within the same computing device (or set of computing devices) that implement the CPTM 112 and/or database 116, and/or one or more composites of the SOA application 102. The report generation module 118 may be configured to access the snapshots 120 stored by the database 116, and may generate reports based upon the snapshot data. The reports may be provided to users via a web browser (e.g., as HTML, JavaScript, JSON, WL, etc.), via a different type of application (e.g., a special-purpose SOA management application), as a plaintext file or formatted file (e.g., a spreadsheet, PDF, Word document), sent within or as an attachment to an email or other electronic message, etc. In some embodiments, the report generation module 118 also may construct and provide an interactive user interface (e.g., including user interface input elements) that allows users to navigate through the data of a particular snapshot 120 (e.g., a snapshot 120 for the whole SOA application 102) or various portions of a snapshot 120 (e.g., at a composite level for one or more composites, a component level for one or more components, or a queue level for one or more queues, etc.). The interfaces provided by the report generation module 118, which may include graphical user interfaces and/or programmatic interfaces (e.g., APIs to be accessed by other programs on external systems 122) also may allow users access to data of other snapshots 120, support creation of custom reports based upon one or more snapshots 120, and may determine and/or perform or otherwise initiate various remediation measures on the SOA application 102 or elsewhere within the SOA system 100.

The performance monitor module 114 may be configured to interact with the CPTM 112 to view "live" (e.g., current) reported data received from the SOA application 102, and/or may interact with the database 116 to view recent (or historic) snapshot data 120. Using the data received from the CPTM 112 and/or database 116, the performance monitor module 114 may detect performance issues and/or bottlenecks within the SOA application 102. If and when a performance issue and/or bottleneck is detected, using the processes and techniques described herein, the performance monitor module 114 may generate an alert, notify users of the issue, and/or attempt to initiate a remediation of the issue as described below.

In various embodiments, the entities (e.g., systems, devices, processes, etc.) depicted in FIG. 1, as well other entities not depicted herein (e.g., other external systems) may be implemented by computing devices of various types including, but not limited to, personal computers (PCs), desktops, mobile or handheld devices such as laptops, mobile phones, tablets, etc., and other types of devices. Some or all of the entities depicted herein may utilize one or more communication networks to facilitate communications. The one or more communication networks may include networks of various types, each of which may include one or more networking devices or equipment, including but not limited to network switches, routers, bridges, load balancers, etc. Examples of one or more communication networks include, without restriction, the Internet, a wide area network (WAN), a local area network (LAN), an Ethernet network, a public or private network, a wired network, a wireless network, a virtual network, etc., and combinations thereof. Various different communication protocols may be used to facilitate the communications through the one or more communication networks including both wired and wireless protocols such as the IEEE (Institute of Electrical and Electronics Engineers) 802 suite of protocols, Internet Protocol (IP), TCP/IP (Transmission Control Protocol/Internet Protocol), Asynchronous Transport Mode (ATM), frame relay network protocols, Multi-Protocol Label Switching (MPLS), OpenFlow, IPX (Internetwork Packet Exchange), SAN (Storage Area Network) protocols, AppleTalk, Bluetooth, Long-Term Evolution (LTE), and other protocols.

Figure 2:
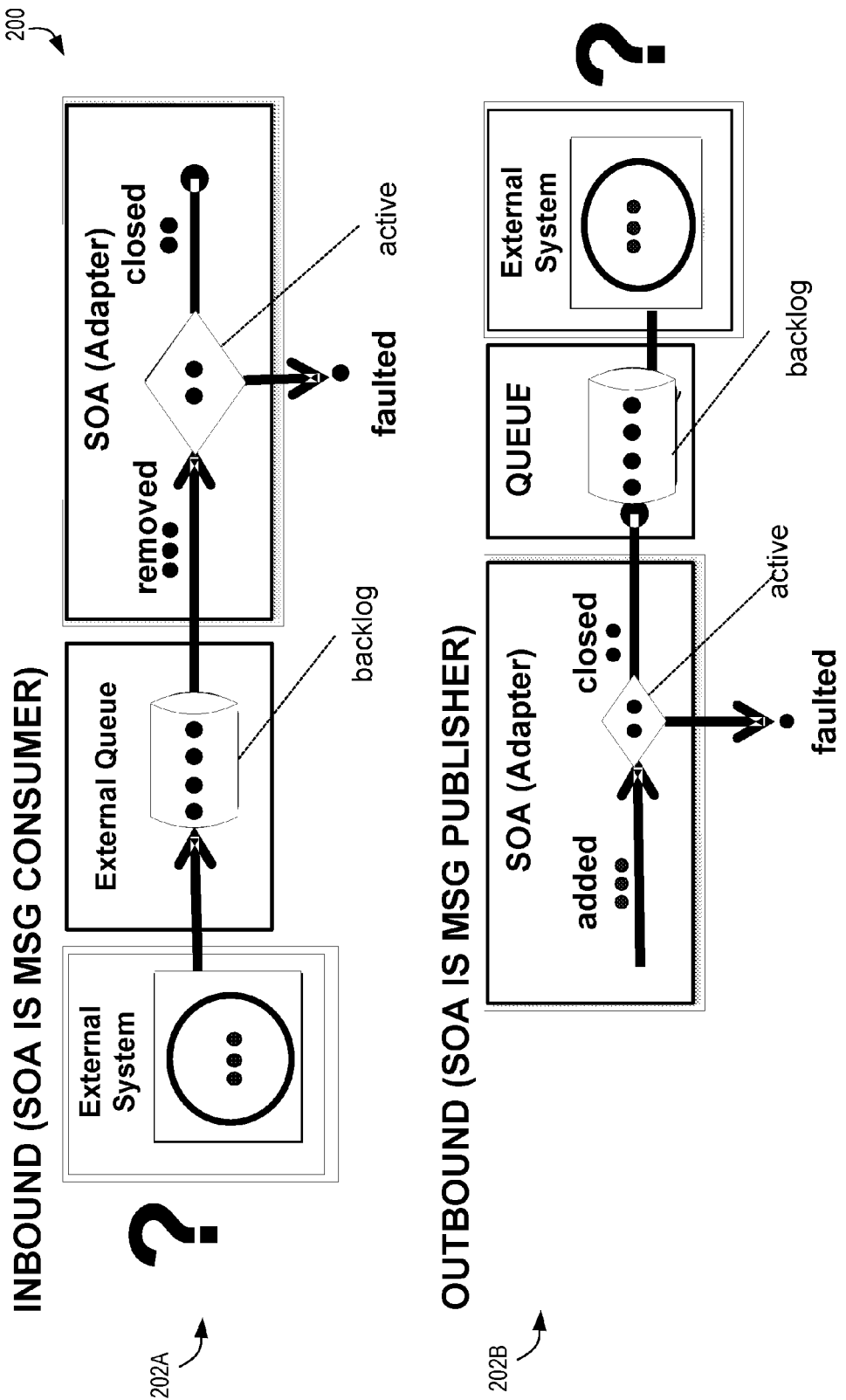
FIG. 2 is an illustrative diagram showing example backlogs and active counts in inbound and outbound external queues, according to various embodiments of the present invention.

Referring now to FIG. 2, a diagram 200 is shown including two examples of backlogs (or "backups") and active counts, in inbound and outbound external queues, according to certain embodiments described herein. As discussed above, queue backup may be a function of the messages added to and removed from the queues. It may be straightforward in some implementations for the CPTM 112 to measure data associated with internal SOA queues, because the service engine 110 may be configured to report a wide variety of information associated with an internal queue. For example, the service engine 110 may transmit status data for some or all internal SOA queues (e.g., internal queue 108) to the CPTM 112, including, for example, details about those components/modules writing to the internal queue 108, fine-grained details about the current state of the internal queue 108 itself, and details about those components/modules reading from the internal queue 108. For example, in some embodiments the service engine(s) 110 may maintain data for internal queues 108 to record the number of messages added/removed/closed/faulted, and this information may be used to calculate the active counts, backups, and external systems activity for these internal queues 108 for a given snapshot 120. Additional details relating to determining internal queue backups and active counts is discussed below in reference to FIG. 3.

However, in contrast to receiving data and performing performance/bottleneck analyses on internal queues, receiving performance measurement data and determining performance issues may be more different for external queues (e.g., queues 124 and 126), because the CPTM CPTM 112 and/or service engine 110 might not have the ability to determine the messages added for inbound queues (e.g., queue 124) or messages removed for outbound queues (e.g., queue 126) by external clients 122 and/or 128. For example, in some cases an SOA system 100 might not have the ability and/or authorization to instrument the external clients 122 and 128 that add and/or remove requests to external queues 124 and 126. Instead, in some configurations, the only visibility into an external queue, aside from reading from it or writing to it, may be a simple request to determine a current queue depth.

In FIG. 2, two examples are shown of external queues utilized by asynchronous applications (e.g., SOA applications 102), represented by diagram 202A and diagram 202B.

Diagram 202A in FIG. 2 illustrates an example SOA application (e.g., an "adapter" or binding of a SOA application) which is consuming messages via an inbound external queue (e.g., 124). In this example, diagram 202A includes a first external system with three messages, which writes to an external queue having a backlog of four messages. Diagram 202A also includes a SOA adapter application that is reading from the external queue. In this example, three messages are identified as removed, two messages are deemed "active" (e.g., actively being processed by the SOA application, or still requiring processing by the application), one message is identified as having faulted (e.g., caused a failure event, cannot be processed by the SOA application, etc.), and two messages have been "closed" (e.g., have completed processing by the SOA application).

Diagram 202B, in contrast, shows an example SOA application 102 that produces messages for an outbound external queue. Specifically, diagram 202B may represent a view of the same SOA application from diagram 202A, but now from the perspective as a producer of messages for an outbound external queue. In this case, the outbound external queue currently has a backlog of four messages. Diagram 202B also includes an external system configured to read messages from the external queue, and is shown as having just removed three messages from the queue.

In some embodiments, the backup and active counts in external queues may be determined by instrumenting the SOA application 102 only, and by relying upon one or more APIs from one or more external messaging systems that may provide the depth of the queue when queried.

However, in other examples, the backlog of an inbound external queue may be determined using other techniques, such as those described below. For the purposes of these descriptions, the term "origination" may refer to a particular time of origin, which may correspond to an initial launching of the SOA application and/or server, or may correspond to an overall beginning of a statistical data collection point, etc.

In some embodiments, the backlog for an external queue (e.g., either an inbound external queues or an outbound external queue) may be calculated using the following equation:

Backlog=queue depth at origination($D0$)+queue depth at beginning of time period($DE$)−queue depth at end of time period($DS$)

In examples using the above equation, the D0 value may be determined by querying the particular external queue for a current queue depth, which may be returned to the SOA application 102 (e.g., the service adapter), which then may be provided to the CPTM 112 by the reporting modules. In some cases, the CPTM itself may directly query external queues to determine current queue depth. The DE value in some examples may be similarly determined, by querying the particular external queue for the current depth at the time of the beginning of the time period/snapshot. In some embodiments where snapshots are continually monitored, at the end of the time period (which may correspond to the beginning of the next time period), the DS for the expiring time period and the DE for the next time period may be attained using just one query for a current depth of the queue.

Several illustrative flow diagrams are now discussed in relation to various embodiments of the invention. The operations of certain flow diagrams are described with reference to the example embodiments of the other diagrams. However, it should be understood that the operations of these flow diagrams may be performed by various embodiments other than those discussed with reference to these other diagrams, and the embodiments discussed with reference these other diagrams may perform operations other than those discussed with reference to the flow diagrams. Additionally, although the flow diagrams in this figures show a particular order of operations performed by certain embodiments, it should be understood that such order is illustrative only, and that alternative embodiments may perform the operations in a different order, may combine certain operations, and/or may overlap certain operations.

Figure 3:
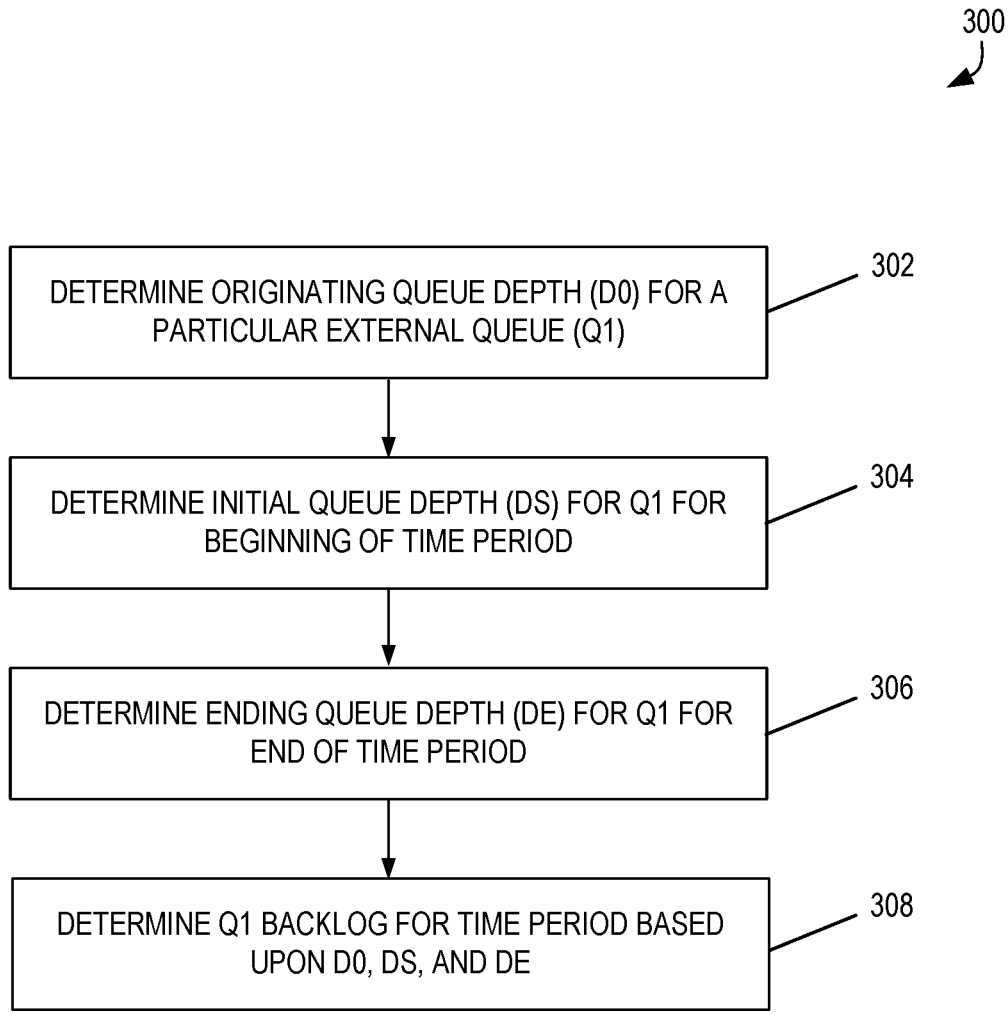
FIG. 3 is a flow diagram illustrating an example process of analyzing and determining external queue backlogs which may be performed, for example, by a central performance tracking module, according to various embodiments of the present invention.

Referring now to FIG. 3, an illustrative flow diagram is shown depicting an example process for analyzing external queue backlogs. As discussed below, the steps in this example process may be performed by a central performance tracking module 112 and/or a performance monitor module 114 configured to determine external queue backlogs.

In step 302 of flow diagram 300, an originating queue depth (D0) may be determined for a queue. In some cases, step 302 may be performed using data obtained by querying (e.g., via a service engine 110) for a queue depth at some time of origination, which may be before the beginning of the snapshot time period. In some embodiments, the queue depth may be queried at the same time as the beginning of a first snapshot time period. This queue depth data may be reported to the CPTM 112, for example, via a report message sent from the reporting module, service engine 110, SOA application 102, or even from external queue itself (e.g., queue 124 or queue 126).

In step 304, the CPTM 112 may determine an initial queue depth ("DS") for the queue for the beginning of the snapshot time period. This step may be performed by the CPTM 112 receiving a report message from another entity, such as a report module of a service engine 110, which had queried the particular queue at the beginning of the snapshot time period. In some cases, this data may be the same as an ending queue depth ("DE") obtained for a most recent previous snapshot time period.

In step 306, the CPTM 112 may determine an ending queue depth (DE) for the time period. In some cases, these step also may include the CPTM 112 receiving a report message from an entity that had queried the queue for a queue depth at the end of the period. Similar to the description above for step 304, this same data may also be used as a DS value for a subsequent snapshot time period.

In step 308, the CPTM 112 (and/or performance monitor module 114) may determine the backlog for the external queue for the time period, based on the D0, DS, and DE values determined in steps 302-306. As discussed above, in some embodiments, the CPTM 112 may calculate the queue backlog for the snapshot time period by adding D0 with DE, and then subtracting DS (D0+DE−DS). In some embodiments, in addition to determining backups for external queues, the CPTM 112 also may be configured to identify external system activity associated with external queues. For example, the CPTM 112 may receive and analyze data describing messages added to an inbound external queue during a time period, and/or data describing messages removed from an outbound external queue during the time period.

Figure 4:
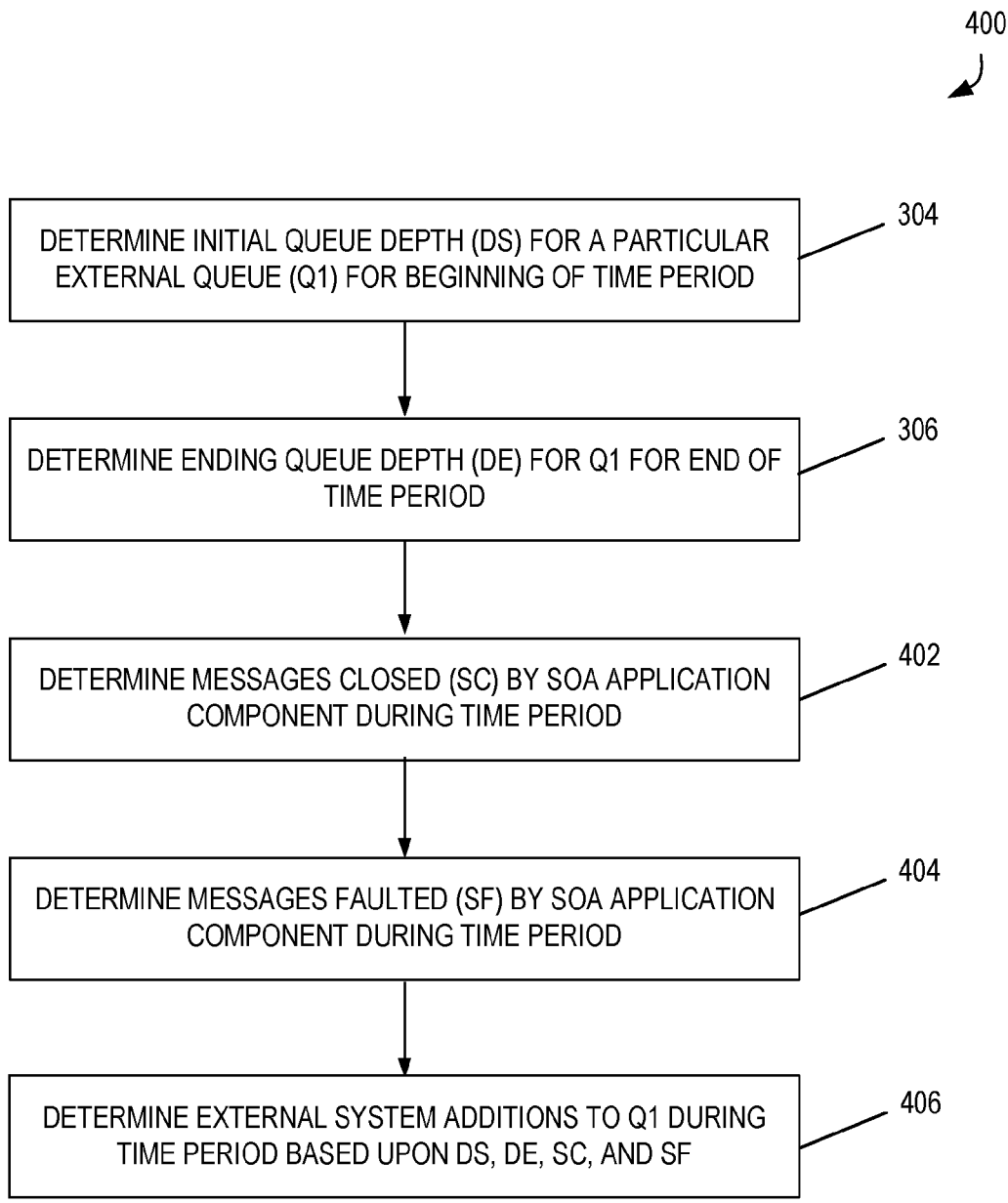
FIG. 4 is a flow diagram illustrating an example process of analyzing external system activity and determining external system inbound queue additions, which may be performed by a central performance tracking module, according to various embodiments of the present invention.

Referring now to FIG. 4, another illustrative flow diagram is shown depicting an example process for analyzing external system activity, and specifically, for determining additions to external queue by external systems. As discussed below, the steps in this example process may be performed by a central performance tracking module 112 and/or a performance monitor module 114 configured to determine and analyze additions to external queues (e.g., inbound external queue 124). In some embodiments, the process 400 may rely upon data gathered for process 300 of FIG. 3, although both of these processes need not be performed.

In this example, process 400 may include step 304, described above in reference to FIG. 3, in which an initial queue depth (DS) for a snapshot time period may be obtained, as well as step 306, in which an ending queue depth (DE) for the time period may be obtained.

Then, in step 402, the CPTM 112 may determine the count of messages closed ("SC") by one or more particular SOA application components, for example, the component(s) 106a reading from the inbound external queue 124, during the time period. As discussed above, in some embodiments, the service engine(s) 110 may be configured to send report messages (e.g., make API and/or function calls) to the CPTM 112 to report each time the SOA application 102 "closes" a message. In such cases, the CPTM 112 may initiate and maintain a rolling counter during each time period, and may increment this counter with the arrival of each closing report message. However, different embodiments may perform this determination using various different techniques. For example, in some cases, each report message received during the time period may be stored by the CPTM 112, which then may count these messages at (or after) the end of the time period, etc.

In step 404, the CPTM 112 may determine the count of messages faulted ("SF") by the SOA application component (e.g., component 106a). In some embodiments, this procedure may occur as described above with respect to block 402, and thus a service module may report instances of messages faulting using report messages, and the CPTM 112 may use a process (e.g., time period specific rolling counters, end of time period aggregation, etc.) to determine how many such fault messages are received during the time period.

In step 406, the CPTM 112 (and/or performance monitor module 114) may determine the number of external system additions (i.e., the number of messages added to the inbound external queue 124) during the time period, based on the DS, DE, SC, and SF values determined above in steps 304, 306, 402, and 404. In some embodiments, the number determined in step 406 may be calculated as a difference between DE and DS, added to SC and SF (e.g., (DE−DS)+SC+SF).

Figure 5:
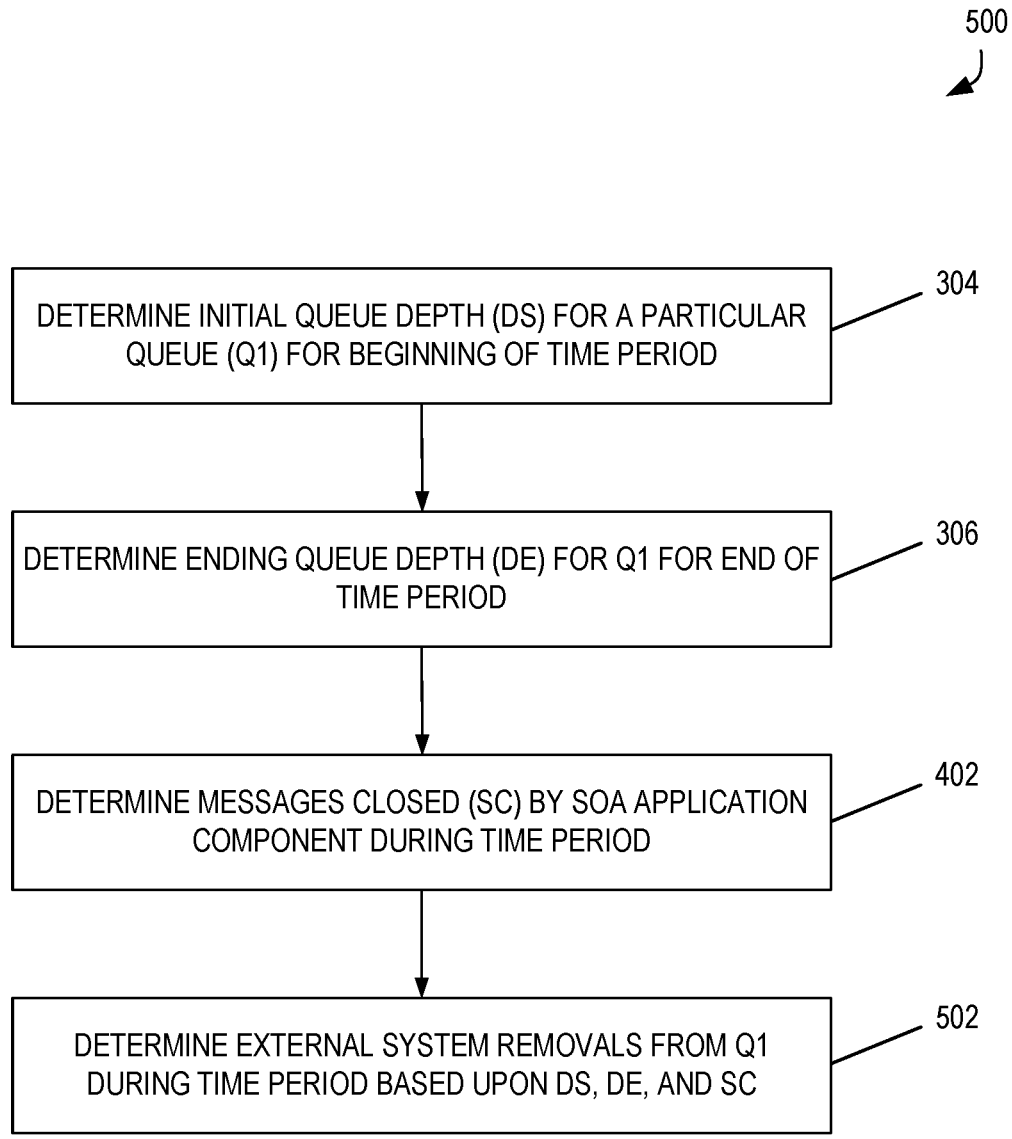
FIG. 5 is a flow diagram illustrating an example process of analyzing external system activity and determining external system outbound queue removals, which may be performed by a central performance tracking module, according to various embodiments of the present invention.

Referring now to FIG. 5, another illustrative flow diagram is shown depicting an example process for analyzing external system activity, and specifically, for determining removals from external queues by external systems (e.g., 122). As discussed below, the steps in this example process may be performed by a central performance tracking module 112 and/or a performance monitor module 114 configured to determine and analyze removals to external queues (e.g., outbound external queue 126).

In some embodiments, process 500 may include some similar operations to those described above in FIG. 3 and FIG. 4. Thus, the data collected by the CPTM 112 may be used in multiple different types of determinations and/or processes. However, it should be understood that various different SOA systems 100 may be configured to implement all or only some (e.g., only one) of these processes.

In this example, process 500 includes block 304, in which the CPTM 112 may determine an initial queue depth at the beginning of a snapshot time period, as described above in reference to FIG. 3. Then, process 500 includes block 306, in which the CPTM 112 may determine an ending queue depth at the end of the snapshot time period, as described above in reference to FIG. 3. Then process 500 includes 402, in which the CPTM 112 may determine a count of the messages closed (SC) by the SOA application component, as described above in reference to FIG. 4. However, in this scenario the SOA application 102 is a component placing messages into an outbound external queue 126, as opposed to the FIG. 4 description of a component that removes messages from an inbound external queue 124. Of course, in some cases, a single component potentially may read from an inbound external queue 124 and also write to an outbound external queue 126.

In step 502, the CPTM 112 may determine the external system outbound queue message removal count (i.e., the number of messages removed from an outbound external queue by one or more external systems) during the time period, based on the DS, DE, and SC values calculated in steps 304, 306, and 402. In some embodiments, the count determined in step 502 may be calculated as a difference between DS and DE added to the SC value ((DS−DE)+SC).

Figure 6:
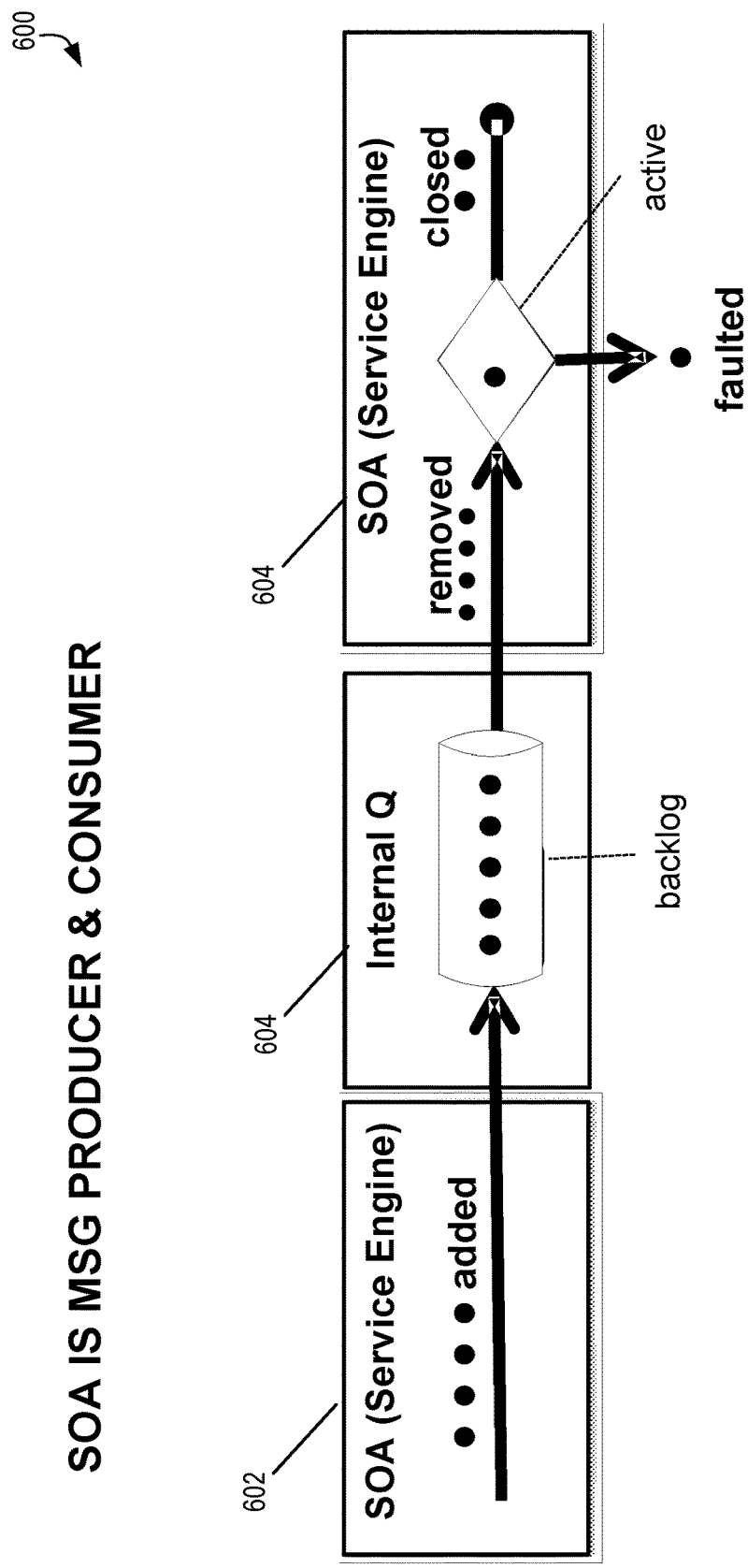
FIG. 6 is an illustrative diagram showing example backlogs and active counts in an internal queue of a portion of a service-oriented architecture application, according to various embodiments of the present invention.

In some embodiments, similar determinations also may be performed for internal queues (e.g., queue 108). For example, referring now to FIG. 6, a diagram 600 is shown including an example of backlogs (or "backups") and active counts, for an internal queue, according to certain embodiments described herein. As described above in reference to FIG. 2, an SOA application 102 may utilize one or more internal queues 108 between portions (e.g., different components, processes, etc.) of the SOA application. With respect to internal queues, and unlike for external queues, the SOA application 102 is both the message producer and the message consumer. Accordingly, the example diagram shown in FIG. 6 includes a first SOA component 602 (e.g., a component executed by a service engine) with four messages, an internal queue 604 with a backlog of five messages, and a second SOA component 606 with four removed messages, one active message, two closed messages, and one faulted message.

Another example illustrating how the CPTM 112 may determine the backlog of an internal queue is now presented in the following paragraphs, using simple numbers for ease of understanding. In this example, it may be assumed that the internal queue itself may report, upon request, a current queue depth.

In this example, it may be assumed that a depth of the internal queue at a starting time is 50, and that, during a measurement time period, one or more reporting modules has reported 40 total messages being added to the queue (e.g., by the first SOA component 602), that 40 messages have been removed from the queue (e.g., by the second SOA component 606), that 20 messages marked as closed by the second component 606, and that 10 messages have been faulted by the second component 606.

Using the above information, the CPTM 112 may, for example, calculate the following values:

active count=removed−processed=40−30=10 processed count=closed+faulted=20+10=30 internal queue backlog=depth_at_start+added−processed=50+40−30=60

Accordingly, in this example, the CPTM 112 may determine that the number of messages processed during the time period is 30, that the active count of messages being processed is 10, and that the backlog of the internal queue 604 (based on the depth of the queue at the start and the numbers of messages reported, through instrumentation, as added to the queue by the first component 602 and processed by the second component of the application 606) is 60.

Figure 7:
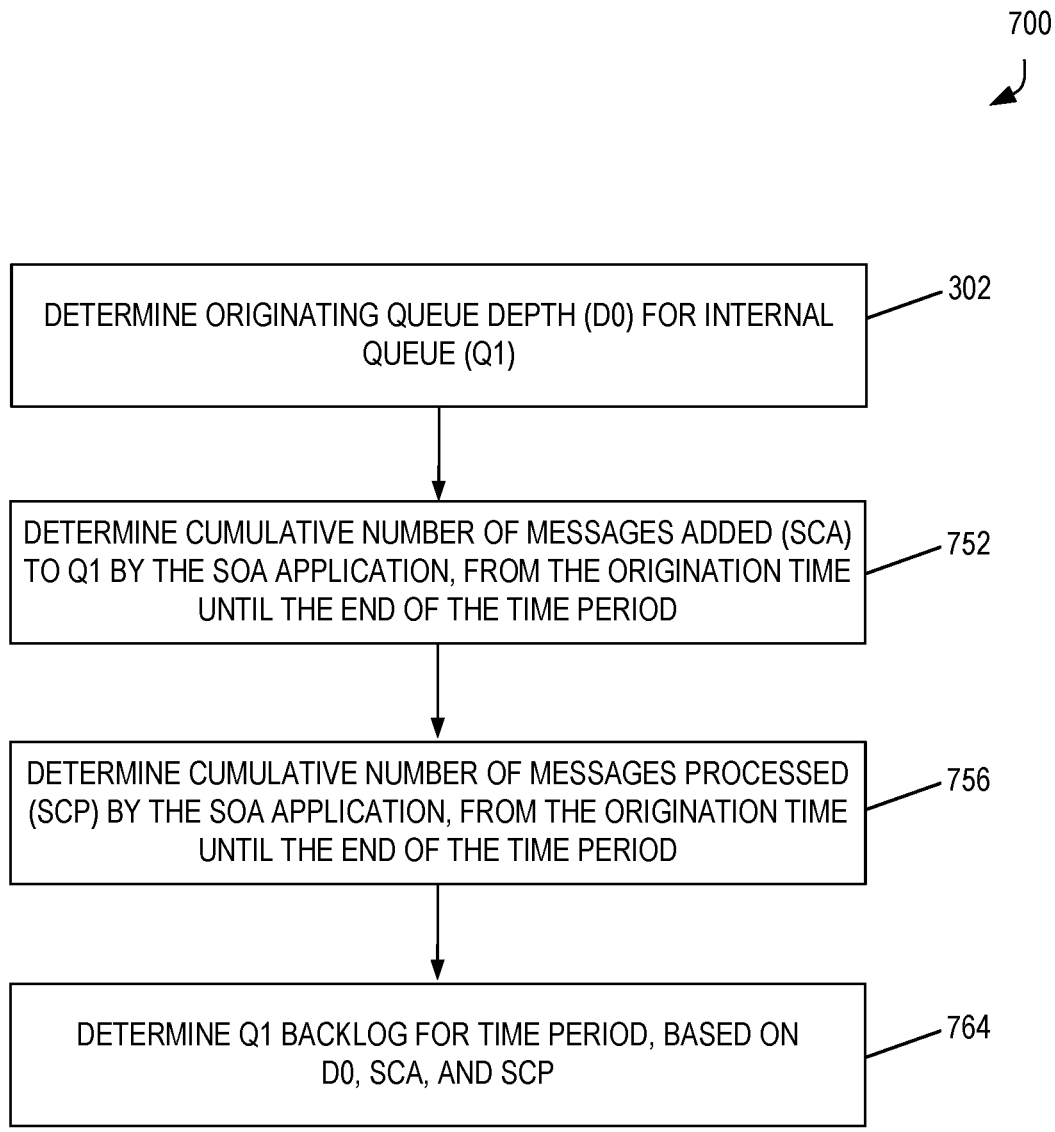
FIG. 7 is a flow diagram illustrating an example process of analyzing internal queues and determining an internal queue backlog, which may be performed by a central performance tracking module, according to various embodiments of the present invention.

However, in some embodiments, the CPTM 112 may tracks cumulative data counts as opposed to snapshot-specific data counts. For example, the CPTM 112 may track a cumulative (or aggregate) number of messages that have been removed since some point of origination, which may be before the beginning of the time period. Similarly, other data values may be tracked (and persisted within snapshots) in aggregate. In some embodiments, the storage of such aggregate data values may allow for the simple creation of custom reports spanning from one particular time period to another (i.e., including data from multiple snapshots). Accordingly, referring now to FIG. 7, an example flow diagram is shown depicting a process 700 for analyzing and determining backlog of internal queues using such cumulative operations.

In this example, process 700 includes step 302, discussed above in reference to FIG. 3, in which an originating queue depth (D0) is determined for the internal queue.

In step 752, the CPTM 112 may determine may determine a cumulative count of messages added ("SCA") to the internal queue 108 by the SOA application 102, from the origination time until the end of the time period. In some embodiments, this step may include incrementing a running SCA value counter during the time period for each received "add" report message (e.g., each message indicating that a component has added a message to the internal queue). In some cases, the SCA value counter may be incremented across snapshot boundaries, and thus may track the number of cumulative messages added since the origination point. In other cases, a snapshot-specific counter may be incremented, and added (at the end of the time period) to an SCA count as of the end of the previous time period. Of course, it should be understood that other ways for implementing this determination may be performed in other embodiments.

In step block 756, the CPTM 112 may determine a cumulative number of messages processed ("SCP") by the queue-reading SOA application component(s), since the origination time. In some embodiments, this may include incrementing a cumulative messages closed ("SCC") value for each received "closed" report message during the time period. Additionally, this step may include incrementing a cumulative message faulted value ("SCF") value for each received "faulted" report message during the time period, and then may include determining the SCP value by adding together the determined SCC value and SCF value.

In step 764, the CPTM 112 may determine the internal queue backlog for the time period, using the D0, SCA, and SCP values determined in steps 302, 752, and 756. In some cases, the internal queue backlog for the time period may be calculated as the result of SCP being subtracted from the sum of D0 and SCA using the equation (D0+SCA−SCP).

Additionally, in some embodiments, the CPTM 112 may be configured to utilize report messages generated to determine "active" counts and other useful processing-related information. For example, the CPTM 112 may determine the "active" count of messages within SOA using the following equations:

Active_inbound=SOA cumulative removed(SCR)−SOA cumulative processed (SCP)

Active_outbound=SOA cumulative added(SCA)−SOA cumulative processed(SCP)

Where:

SOA cumulative processed(SCP)=SOA cumulative closed(SCC)+SOA cumulative faulted(SCF)

SOA cumulative added(SCA)=SCA+SOA snapshot added(SA)

SOA cumulative closed(SCC)=SCC+SOA snapshot
closed(SC)

SOA cumulative faulted(SCF)=SCF+snapshot faulted
(SF)

In the example above, it may be noted that each of SR, SA, SC, and SF may be readily determined by the CPTM 112, based on data directly reported from the SOA application 102 and/or service engine 110. For example, each time the SOA application 102 successfully adds a message to an external queue, a message may be reported to the CPTM 112, and thus the SA and/or SCA values may be adjusted in response.

Additionally, two simple examples of statistics that potentially may be generated by various embodiments described here, are now presented for ease of understanding. The first example provides illustrative data for Inbound External Queue calculations, and may be viewed with the context provided by diagram 202A of FIG. 2.

In the first example, based on queries to a queue (e.g., the external queue of diagram 202A), D0, DS, and DE values may be determined. In this example, it may be assumed that the depth of the queue at an origination time, or "D0", is 20. This value may be obtained by querying for the current queue depth of the external queue at the very beginning of an aggregation time period, such as, for example, a "server start." It may also be assumed that the depth of the queue at the start of the snapshot time period, or "DS", is also 20. This value may be obtained by querying for the current queue depth of the external queue at the beginning of the snapshot time period. It may further be assumed that the depth of the queue at the end of the snapshot time period, or "DE", is 300. This value may be obtained by querying for the current queue depth of the external queue at the ending of the snapshot time period.

Several additional values may be determined based upon received report messages. For example, we assume that the number of messages removed from the queue by the SOA application 102, or "SOA Removed", is 25. This value may be obtained by instrumenting the SOA system (e.g., a binding/adapter, a service agent, etc.) to send report messages to the CPTM 112 each time such a message is removed. Similarly, it may be assumed that the number of messages successfully processed by the SOA application 102, or "SOA Closed", is 15. It may further be assumed that the number of messages that could not be successfully processed, or "SOA Faulted", is 5. Again, these values may be obtained through instrumentation of the SOA system 100 and/or application 102 itself.

With the above values, the CPTM 112 then may determine, for example, the following values using these equations:

=>SOA Processed=SOA Closed+SOA Faulted=15+
5=20

=>Active=SOA Removed−SOA Processed=25−20=5

=>External Added=$DE$+SOA Processed−$DS$=300+
20−20=300

=>Backlog=$D0$+($DE$−$DS$)=20+300−20=300

Accordingly, for the snapshot time period in this example, the CPTM 112 may determine that 20 messages have been processed by the SOA system 100, and that 5 messages are still active. Additionally, the CPTM 112 may determine that 300 messages have been added to the external queue by the external system, and further may determine that the backlog of the external queue is also 300 messages.

In a second example, illustrative data may be provided for outbound external queue calculations. This second example, discussed below, may be viewed in the context provided by FIG. 6.

In this second example, through querying, the CPTM 112 may determine that the DS, or depth of queue at start is 50 messages. Based upon the instrumentation/report messages received during the time period, the CPTM 112 may determine that the number added is 40, the number removed is 40, the number closed is 20, and the number faulted is 10.

In this second example, the CPTM 112 may use these values to determine this additional data using the following equations:

processed count=closed+faulted=20+10=30 active count=removed−processed=40−30=10 backlog=depth_at_start+added−processed=50+40−
30=60

In various embodiments, some or all of the data discussed in connection with the above examples may be stored in snapshot records 120 in one or more databases 116. In some embodiments, the snapshot 120 may be presented to a user in a report by the report generation module 118, and in some embodiments a performance monitor module 114 may process the snapshot data 120 to detect the occurrence of a performance issue in the SOA system 100, and/or to identify a likely cause of the performance issue. For example, in some embodiments, the performance monitor module 114 may determine whether the application performance issue is due to external systems (e.g., 122 and/or 128) or is due to a problem internal to the SOA application 102 itself, based upon the backlog amount of various queues. For instance, if the backlog amount of an inbound external queue (e.g., queue 124) is very small (or even zero) in terms of messages backlogged, then the CPTM 112 and/or performance monitor module 114 may conclude that the performance degradation of the system 100 may be caused by an external system (e.g., 122) not providing enough work for the SOA system 100. Similarly, if the backlog amount of an outbound external queue (e.g., queue 126) is very large, indicating that many messages are backlogged in the outbound external queue, then the CPTM 112 and/or performance monitor module 114 may conclude that the performance degradation may be caused by an external system (e.g., 122 or 128) not retrieving the processed information at an appropriate rate, and thereby slowing down the performance of the SOA system 100. Accordingly, in some embodiments, alerts, notifications, and/or remediation measures (e.g., increasing a thread pool, increasing computing resources provided for a system component, etc.) may be automatically triggered based upon what analyses and determinations are performed by the CPTM 112 and/or performance monitor module 114 regarding the cause of the performance degradation of the system 100.

Figure 8:
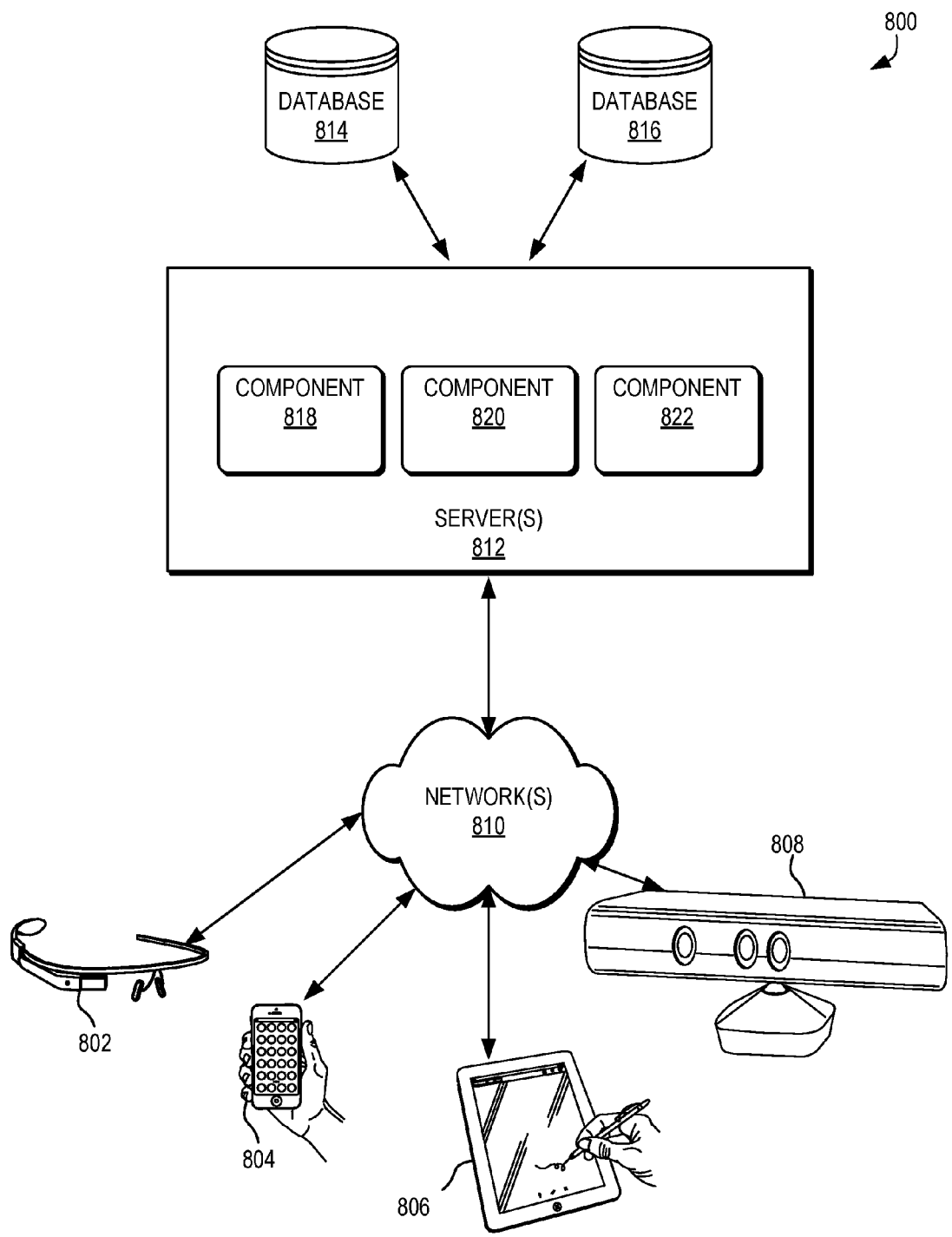
FIG. 8 illustrates a simplified diagram of a distributed system for implementing some embodiments of the present invention.

FIG. 8 illustrates a simplified diagram of a distributed system for implementing some embodiments of the present invention. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications such as services and applications that provide SAO system processing. In certain embodiments, server 812 may also provide other services or software applications that can include non-virtual and virtual environments. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in FIG. 8, software components 818, 820, and 822 of system 800 are shown as being implemented on server 812.

These components may include one or more of underlying SOA system backend components, the components/composites of a SOA application 102, the central performance tracking module of FIG. 1, the performance monitor module of FIG. 1, and/or the report generation module of FIG. 1.

In other embodiments, one or more of the components of system 1000 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in FIG. 8 is thus one example of a distributed system for implementing an embodiment system and is not intended to be limiting.

Client computing devices 802, 804, 806, and/or 808 may include various types of computing systems. For example, client computing devices may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 810.

Although distributed system 800 in FIG. 8 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 812 can include one or more virtual machines running virtual operating systems, or other computing architectures involving virtualization. One or more flexible pools of logical storage devices can be virtualized to maintain virtual storage devices for the server. Virtual networks can be controlled by server 812 using software defined networking. In various embodiments, server 812 may be adapted to run one or more services or software applications described in the foregoing disclosure. For example, server 812 may correspond to a server for performing processing as described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. These databases may provide a mechanism for storing information such as user interactions information, usage patterns information, adaptation rules information, and other information used by embodiments of the present invention.

For example, databases 814 and 816 may store backend SOA data (as described herein, for example, storing dehydrated processes and/or messages in queues) and/or store data for specific SOA applications.

Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands.

Figure 9:
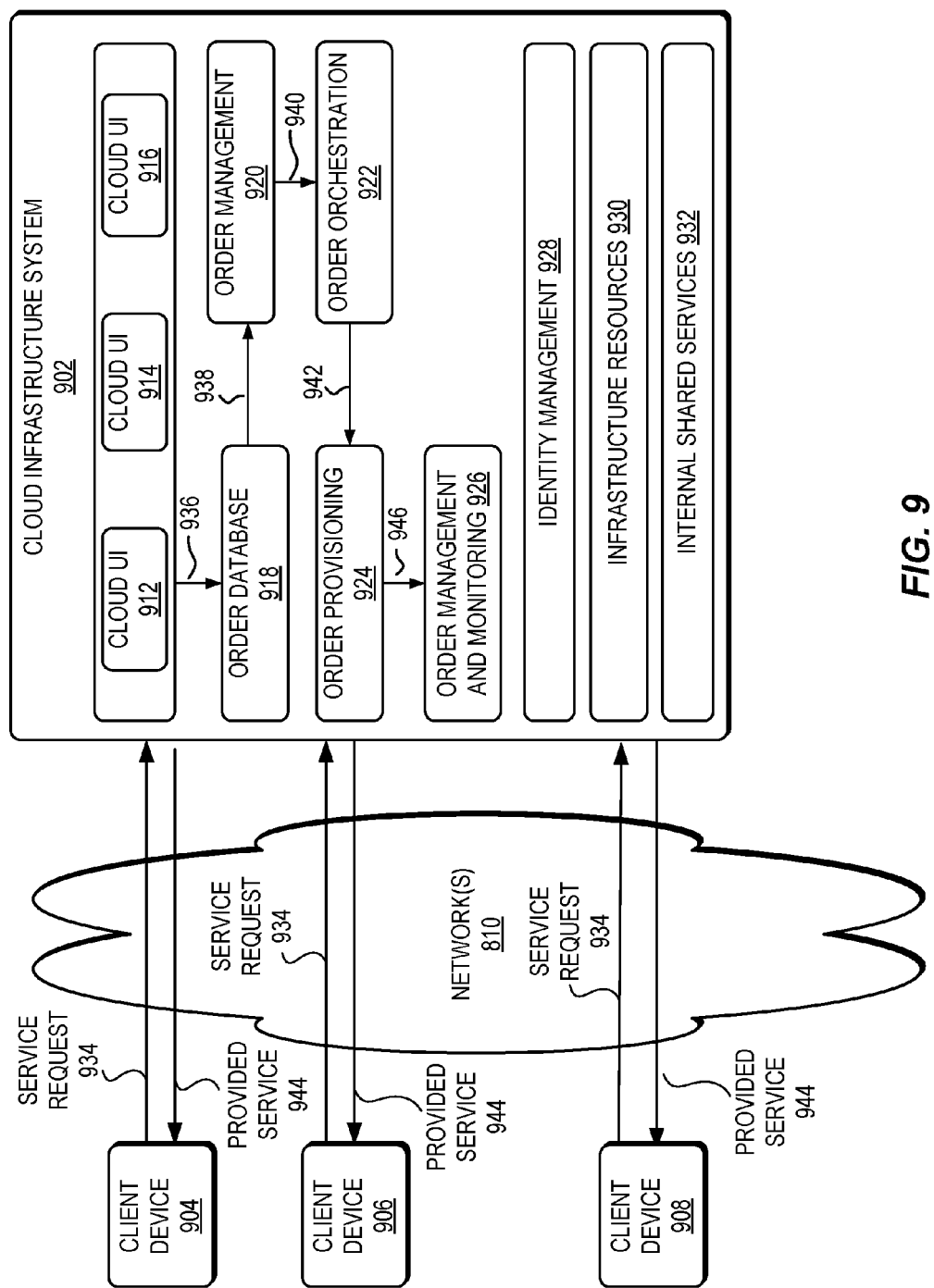
FIG. 9 is a simplified block diagram of one or more components of a system environment in which services may be offered as cloud services, in accordance with some embodiments of the present invention.

In some embodiments, the SOA system/applications may be offered as services via a cloud environment. FIG. 9 is a simplified block diagram of one or more components of a system environment 900 in which services may be offered as cloud services, in accordance with some embodiments of the present disclosure. In the illustrated embodiment in FIG. 9, system environment 900 includes one or more client computing devices 904, 906, and 908 that may be used by users to interact with a cloud infrastructure system 902 that provides cloud services. Cloud infrastructure system 902 may comprise one or more computers and/or servers that may include those described above for server 812.

It should be appreciated that cloud infrastructure system 902 depicted in FIG. 9 may have other components than those depicted. Further, the embodiment shown in FIG. 9 is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808. Client computing devices 904, 906, and 908 may be configured to operate a client application such as a web browser, a proprietary client application (e.g., Oracle Forms), or some other application, which may be used by a user of the client computing device to interact with cloud infrastructure system 902 to use services provided by cloud infrastructure system 902. Although exemplary system environment 900 is shown with three client computing devices, any number of client computing devices may be supported. Other devices such as devices with sensors, etc. may interact with cloud infrastructure system 902.

Network(s) 810 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

In certain embodiments, services provided by cloud infrastructure system 902 may include a host of services that are made available to users of the cloud infrastructure system on demand. In addition to services related to providing SOA application services, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 902 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 902 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle Corporation) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services, and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 902 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 902 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform, and other resources.

In some embodiments, resources in cloud infrastructure system 902 may be shared by multiple users and dynamically re-allocated per demand. Additionally, resources may be allocated to users in different time zones. For example, cloud infrastructure system 902 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 to enable provisioning of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 902, and the like.

In one embodiment, as depicted in FIG. 9, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In an exemplary operation, at 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI) such as cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

At 936, the order information received from the customer may be stored in an order database 918. If this is a new order, a new record may be created for the order. In one embodiment, order database 918 can be one of several databases operated by cloud infrastructure system 918 and operated in conjunction with other system elements.

At 938, the order information may be forwarded to an order management module 920 that may be configured to perform billing and accounting functions related to the order, such as verifying the order, and upon verification, booking the order.

At 940, information regarding the order may be communicated to an order orchestration module 922 that is configured to orchestrate the provisioning of services and resources for the order placed by the customer. In some instances, order orchestration module 922 may use the services of order provisioning module 924 for the provisioning. In certain embodiments, order orchestration module 922 enables the management of business processes associated with each order and applies business logic to determine whether an order should proceed to provisioning.

As shown in the embodiment depicted in FIG. 9, at 942, upon receiving an order for a new subscription, order orchestration module 922 sends a request to order provisioning module 924 to allocate resources and configure resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. This enables order orchestration module 922 to be isolated from implementation details, such as whether or not services and resources are actually provisioned on the fly or pre-provisioned and only allocated/assigned upon request.

At 944, once the services and resources are provisioned, a notification may be sent to the subscribing customers indicating that the requested service is now ready for use. In some instance, information (e.g. a link) may be sent to the customer that enables the customer to start using the requested services.

At 946, a customer's subscription order may be managed and tracked by an order management and monitoring module 926. In some instances, order management and monitoring module 926 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 900 may include an identity management module 928 that is configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
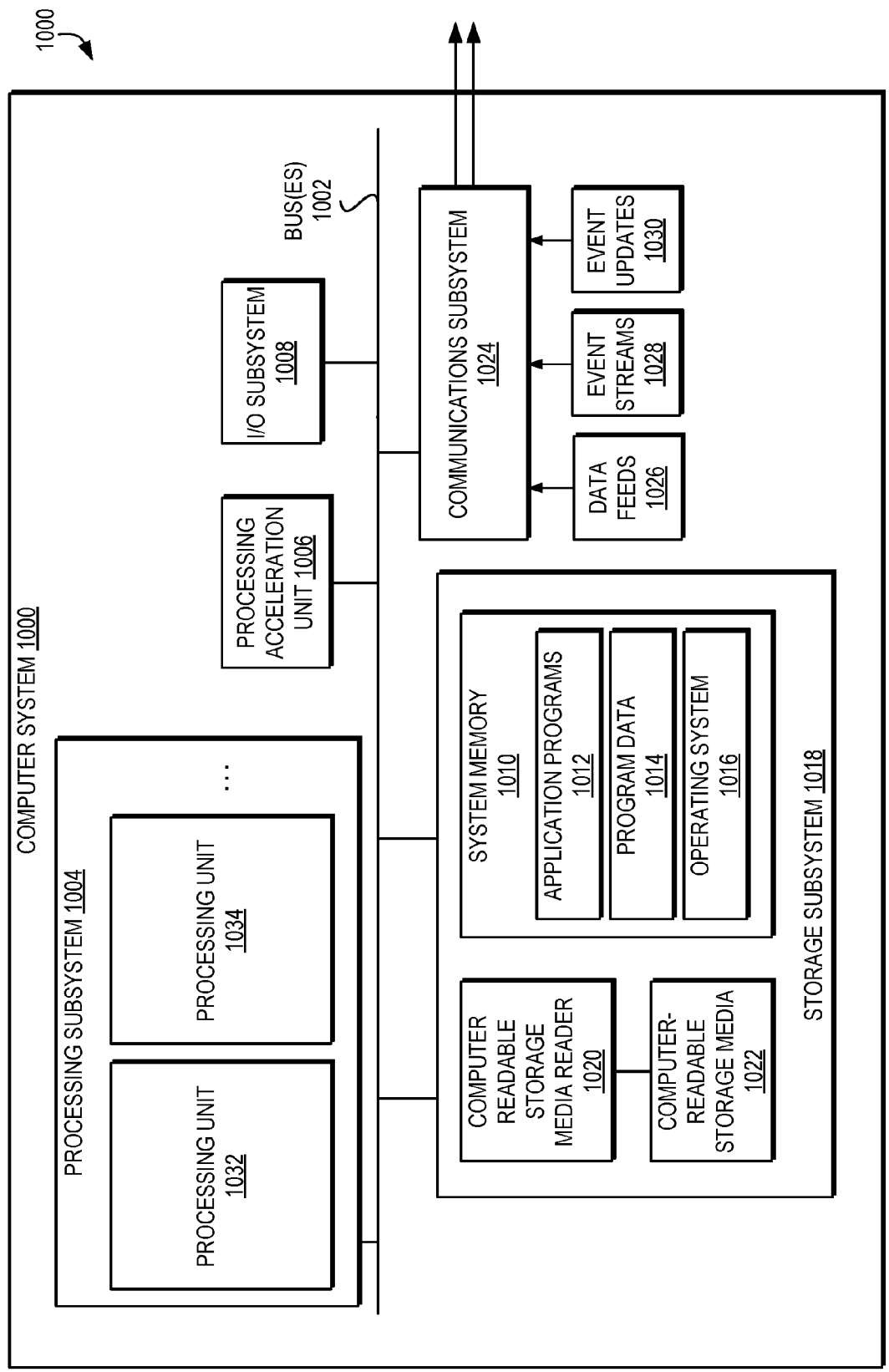
FIG. 10 illustrates an exemplary computer system that may be used to implement certain components according to some embodiments of the present invention.

FIG. 10 illustrates an exemplary computer system 1000 that may be used to implement certain components according to some embodiments of the present invention. In some embodiments, computer system 1000 may be used to implement any of the various servers and computer systems described above. As shown in FIG. 10, computer system 1000 includes various subsystems including a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 may include tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processing units 1032, 1034, etc. A processing unit may include be one or more processors, including single core or multicore processors, one or more cores of processors, or combinations thereof. In some embodiments, processing subsystem 1004 can include one or more special purpose co-processors such as graphics processors (GPUs), digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1022 including potentially on one or more storage devices. Through suitable programming, processing subsystem 1004 can provide various functionalities described above for providing the performance analysis and bottleneck detection in service-oriented applications.

In certain embodiments, a processing acceleration unit 1006 may be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term "input device" is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information that is used by computer system 1000. Storage subsystem 1018 provides a tangible non-transitory computer-readable storage medium for storing the basic programming and data constructs that provide the functionality of some embodiments. Software (programs, code modules, instructions) that when executed by processing subsystem 1004 provide the functionality described above may be stored in storage subsystem 1018. The software may be executed by one or more processing units of processing subsystem 1004. Storage subsystem 1018 may also provide a repository for storing data used in accordance with the present invention.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM) or dynamic random access memory (DRAM).

By way of example, and not limitation, as depicted in FIG. 10, system memory 1010 may store application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1022 may store programming and data constructs that provide the functionality of some embodiments. Software (programs, code modules, instructions) that when executed by processing subsystem 1004 a processor provide the functionality described above may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. Computer-readable media 1022 may provide storage of computer-readable instructions, data structures, program modules, and other data for computer system 1000.

In certain embodiments, storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for storing computer-readable information.

In certain embodiments, computer system 1000 may provide support for executing one or more virtual machines. Computer system 1000 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1000. Accordingly, multiple operating systems may potentially be run concurrently by computer system 1000. Each virtual machine generally runs independently of the other virtual machines.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, communications subsystem 1024 may receive input communication in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication (IPC), and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A service-oriented architecture (SOA) system, comprising:
   one or more client devices, each client device configured to transmit transaction requests to and receive responses from one or more application servers of the service-oriented architecture system;

one or more application servers, each application server configured to:
- execute a plurality of composites of an application; and
- receive and process transaction requests from the one or more client devices; and a computing device configured to execute a performance module, the computing device comprising:
- a processing unit comprising one or more processors;
- one or more network interfaces communicatively coupled with the one or more processors; and
- memory coupled with and readable by the processing unit and storing therein a set of instructions which, when executed by the processing unit, causes the computing device to:
  - receive a first report message from a service-oriented architecture application executing within the service-oriented architecture system, the first report message including queue depth data corresponding to a first point in time for an external queue associated with the service-oriented architecture system;
  - determine an initial queue depth of the external queue, with respect to a time period, based on the first report message;
  - receive a second report message from the service-oriented architecture application, the second report message including queue depth data corresponding to a second point in time for the external queue of the service-oriented architecture system;
  - determine an ending queue depth of the external queue, with respect to the time period, based on the second report message;
  - receive one or more additional report messages from one or more of the composite applications within the SOA application, each of the additional report messages indicating at least one of: (a) a number of messages closed by a component of the SOA application during the time period, or (b) a number of messages faulted by a component of the SOA application during the time period; and
  - calculate a backlog value for the external queue within the service-oriented architecture system, with respect to the time period, based at least on the determined initial queue depth and the determined ending queue depth, and the one or more additional report messages received from the one or more composite applications within the SOA application; and
  - detect a performance degradation within the SOA system, based on the calculated backlog value.

2. The service-oriented architecture system of claim 1, wherein the memory of the computing device configured to execute the performance module stores therein additional instructions which, when executed by the processing unit, causes the computing device to:
- determine an originating queue depth for the external queue within the service-oriented architecture system, wherein the determination of the originating queue depth is performed before receiving the first report message or the second report message,
- wherein calculating the backlog value for the external queue comprises summing the originating queue depth to the ending queue depth, and subtracting the initial queue depth from the sum.

3. The service-oriented architecture system of claim 1, wherein the memory of the computing device configured to execute the performance module stores therein additional instructions which, when executed by the processing unit, causes the computing device to:
- calculate a number of additions made to the external queue within the service-oriented architecture system, during the time period, by the one or more client devices of the service-oriented architecture system.

4. The service-oriented architecture system of claim 3, wherein calculating the number of additions made to the external queue during the time period by the client devices comprises:
- receiving one or more report messages indicating a number of messages closed by a first component of the service-oriented architecture application during the time period;
- receiving one or more report messages indicating a number of messages faulted by the first component of the service-oriented architecture application during the time period; and
- calculating the number of additions made to the external queue during the time period as a difference between the ending queue depth and the initial queue depth, added to the number of messages closed by the first component during the time period, added to the number of messages faulted by the first component during the time period.

5. The service-oriented architecture system of claim 1, wherein the memory of the computing device configured to execute the performance module stores therein additional instructions which, when executed by the processing unit, causes the computing device to:
- calculate a number of removals made from the external queue within the service-oriented architecture system, during the time period, by the one or more client devices of the service-oriented architecture system.

6. The service-oriented architecture system of claim 5, wherein calculating the number of removals made from the external queue during the time period by the client devices comprises:
- receiving one or more report messages indicating a number of messages closed by a first component of the service-oriented architecture application during the time period; and
- calculating the number of removals made from the external queue during the time period as a difference between the initial queue depth and the ending queue depth, added to the number of messages closed by the first component during the time period.

7. The service-oriented architecture system of claim 1, wherein the first report message and the second report message are transmitted by at least one of a reporting module, a service engine, or the service-oriented architecture application.

8. The service-oriented architecture system of claim 1, wherein the first report message and the second report message are transmitted by the external queue to the performance module.

9. The service-oriented architecture system of claim 1, wherein the memory of the computing device configured to execute the performance module stores therein additional instructions which, when executed by the processing unit, causes the computing device to:
- determine, based on a plurality of performance metrics including at least the calculated queue backlog, one or more remediation measures for performance degradation within the service-oriented architecture system.

10. A method, comprising:
receiving, by a computing device executing a performance module, a first report message from a service-oriented architecture application (SOA) executing within a service-oriented architecture system, the service-oriented architecture system comprising one or more client devices and one or more application servers configured to execute a plurality of composite applications within the SOA application, wherein each of the plurality of composite applications executes independently from the other composite applications within the SOA application, and wherein the first report message includes queue depth data corresponding to a first point in time for an external queue associated with the service-oriented architecture system;
determining, by the computing device executing the performance module, an initial queue depth of the external queue, with respect to a time period, based on the first report message;
receiving, by the computing device executing the performance module, a second report message from the service-oriented architecture application, the second report message including queue depth data corresponding to a second point in time for the external queue of the service-oriented architecture system;
determining, by the computing device executing the performance module, an ending queue depth of the external queue, with respect to the time period, based on the second report message;
receiving, by the computing device, one or more additional report messages from one or more of the composite applications within the SOA application, each of the additional report messages indicating at least one of: (a) a number of messages closed by a component of the SOA application during the time period, or (b) a number of messages faulted by a component of the SOA application during the time period;
calculating, by the computing device executing the performance module, a backlog value for the external queue within the service-oriented architecture system, with respect to the time period, based at least on the determined initial queue depth, the determined ending queue depth, and the one or more additional report messages received from the one or more composite applications within the SOA application; and
detecting, by the computing device executing the performance module, a performance degradation within the SOA system, based on the calculated backlog value.

11. The method of claim 10, further comprising:
determining an originating queue depth for the external queue within the service-oriented architecture system, wherein the determination of the originating queue depth is performed before receiving the first report message or the second report message,
wherein calculating the backlog value for the external queue comprises summing the originating queue depth to the ending queue depth, and subtracting the initial queue depth from the sum.

12. The method of claim 10, further comprising:
calculating a number of additions made to the external queue within the service-oriented architecture system, during the time period, by the one or more client devices of the service-oriented architecture system.

13. The method of claim 12, wherein calculating the number of additions made to the external queue during the time period by the client devices comprises:
receiving one or more report messages indicating a number of messages closed by a first component of the service-oriented architecture application during the time period;
receiving one or more report messages indicating a number of messages faulted by the first component of the service-oriented architecture application during the time period; and
calculating the number of additions made to the external queue during the time period as a difference between the ending queue depth and the initial queue depth, added to the number of messages closed by the first component during the time period, added to the number of messages faulted by the first component during the time period.

14. The method of claim 10, further comprising:
calculating a number of removals made from the external queue within the service-oriented architecture system, during the time period, by the one or more client devices of the service-oriented architecture system.

15. The method of claim 14, wherein calculating the number of removals made from the external queue during the time period by the client devices comprises:
receiving one or more report messages indicating a number of messages closed by a first component of the service-oriented architecture application during the time period; and
calculating the number of removals made from the external queue during the time period as a difference between the initial queue depth and the ending queue depth, added to the number of messages closed by the first component during the time period.

16. The method of claim 10, wherein the first report message and the second report message are transmitted by at least one of a reporting module, a service engine, or the service-oriented architecture application.

17. The method of claim 10, wherein the first report message and the second report message are transmitted by the external queue to the performance module.

18. The method of claim 10, further comprising:
determining, based on a plurality of performance metrics including at least the calculated queue backlog, one or more remediation measures for performance degradation within the service-oriented architecture system.

19. A performance monitor device, comprising:
a processing unit comprising one or more processors;
one or more network interfaces communicatively coupled with the one or more processors; and
memory coupled with and readable by the processing unit and storing therein a set of instructions which, when executed by the processing unit, causes the performance monitor device to:
receive a first report message from a service-oriented architecture (SOA) application executing within a service-oriented architecture system, the service-oriented architecture system comprising one or more client devices and one or more application servers configured to execute a plurality of composite applications within the SOA application, wherein each of the plurality of composite applications executes independently from the other composite applications within the SOA application, and wherein the first report message includes queue depth data corresponding to a first point in time for an external queue associated with the service-oriented architecture system;

determine an initial queue depth of the external queue, with respect to a time period, based on the first report message;

receive a second report message from the service-oriented architecture application, the second report message including queue depth data corresponding to a second point in time for the external queue of the service-oriented architecture system;

determine an ending queue depth of the external queue, with respect to the time period, based on the second report message; and receive one or more additional report messages from one or more of the composite applications within the SOA application, each of the additional report messages indicating at least one of: (a) a number of messages closed by a component of the SOA application during the time period, or (b) a number of messages faulted by a component of the SOA application during the time period;

calculate a backlog value for the external queue within the service-oriented architecture system, with respect to the time period, based at least on the determined initial queue depth and the determined ending queue depth, and the one or more additional report messages received from the one or more composite applications within the SOA application; and detect a performance degradation within the SOA system, based on the calculated backlog value.

20. The performance monitor device of claim 19, wherein the memory stores therein additional instructions which, when executed by the processing unit, causes the performance monitor device to:

determine an originating queue depth for the external queue within the service-oriented architecture system, wherein the determination of the originating queue depth is performed before receiving the first report message or the second report message, wherein calculating the backlog value for the external queue comprises summing the originating queue depth to the ending queue depth, and subtracting the initial queue depth from the sum.

\* \* \* \* \*

UNITED STATES PATENT AND TRADEMARK OFFICE
CERTIFICATE OF CORRECTION

PATENT NO. : 10,305,762 B2
APPLICATION NO. : 14/975067
DATED : May 28, 2019
INVENTOR(S) : Bhasin Page 1 of 1

It is certified that error appears in the above-identified patent and that said Letters Patent is hereby corrected as shown below:

In the Specification

In Column 10, Line 21, delete "WL," and insert -- XML, --, therefor.

In Column 11, Line 48, delete "CPTM CPTM" and insert -- CPTM --, therefor.

Signed and Sealed this
Twenty-eighth Day of July, 2020

Andrei Iancu
*Director of the United States Patent and Trademark Office*